(12) United States Patent
Mizuta (10) Patent No.: US 6,616,207 B2
(45) Date of Patent: Sep. 9, 2003

(54) UTILITY VEHICLE

(75) Inventor: Fumio Mizuta, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/201,308

(22) Filed: Jul. 24, 2002

(65) Prior Publication Data

US 2003/0001403 A1 Jan. 2, 2003

Related U.S. Application Data

(63) Continuation-in-part of application No. 09/805,220, filed on Mar. 14, 2001.

(30) Foreign Application Priority Data

Mar. 15, 2000 (JP) .......................................... 2000-72419

(51) Int. Cl.$^7$ ............................................. B62D 33/037
(52) U.S. Cl. ........................ 296/50; 296/57.1; 296/60; 292/DIG. 29; 292/DIG. 73
(58) Field of Search ........................ 296/36, 50, 57.1, 296/60; 292/DIG. 24, DIG. 29, DIG. 73

(56) References Cited

U.S. PATENT DOCUMENTS

| | | | | |
|---|---|---|---|---|
| 357,985 A | * | 2/1887 | Frisbie | ................ 292/DIG. 29 |
| 1,442,542 A | * | 1/1923 | Scherrman | .................... 296/50 |
| 3,113,797 A | * | 12/1963 | Westerdale | .......... 292/DIG. 73 |

FOREIGN PATENT DOCUMENTS

| JP | U 62-187978 | 11/1987 |
|---|---|---|
| JP | U 63-205579 | 12/1988 |

* cited by examiner

Primary Examiner—Dennis H. Pedder
(74) Attorney, Agent, or Firm—Oliff & Berridge, PLC (57) ABSTRACT

A utility vehicle has a load-carrying platform, a pair of side plates, a gate, a pair of gate locking bolts each capable of engaging the side plate to hold the gate in the closed state, and a pair of handles each connected to the gate locking bolt. The gate locking bolt is axially movable in lateral directions between a locking position and a retracted position, and is biased toward the locking position by a spring. The gate locking bolt is capable of being urged toward the retracted position by the side plate when the gate is turned to be closed. The gate locking bolt is capable of being moved to the retracted position by operating the handle.

15 Claims, 7 Drawing Sheets

UTILITY VEHICLE

This is a Continuation-in-Part of Application No. 09/805,220 filed Mar. 14, 2001. The entire disclosure of the prior application is hereby incorporated by reference herein in its entirety.

BACKGROUND OF THE INVENTION

1. Field of the Invention

The present invention relates to a utility vehicle which has a load-carrying platform with side plates and a carrier gate, and is suitable for carrying goods on roads in rough terrains.

2. Description of the Related Art

Figure 5A:
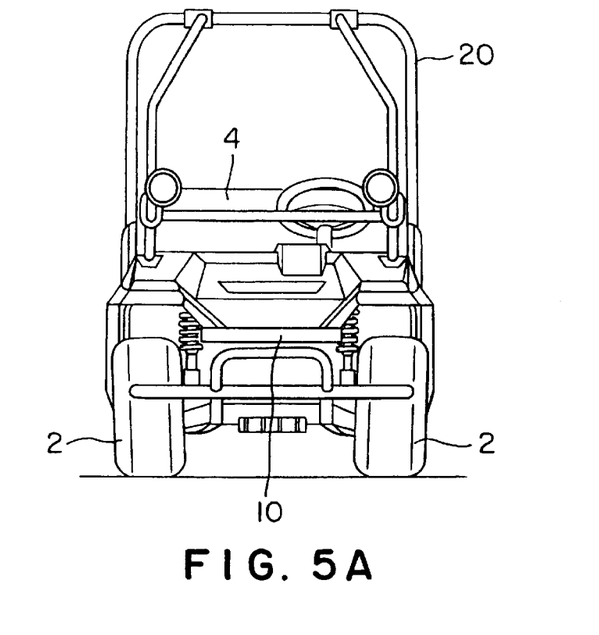
FIGS. 5A and 5B are a front elevation and a side elevation, respectively, of a general utility vehicle.
Figure 5B:
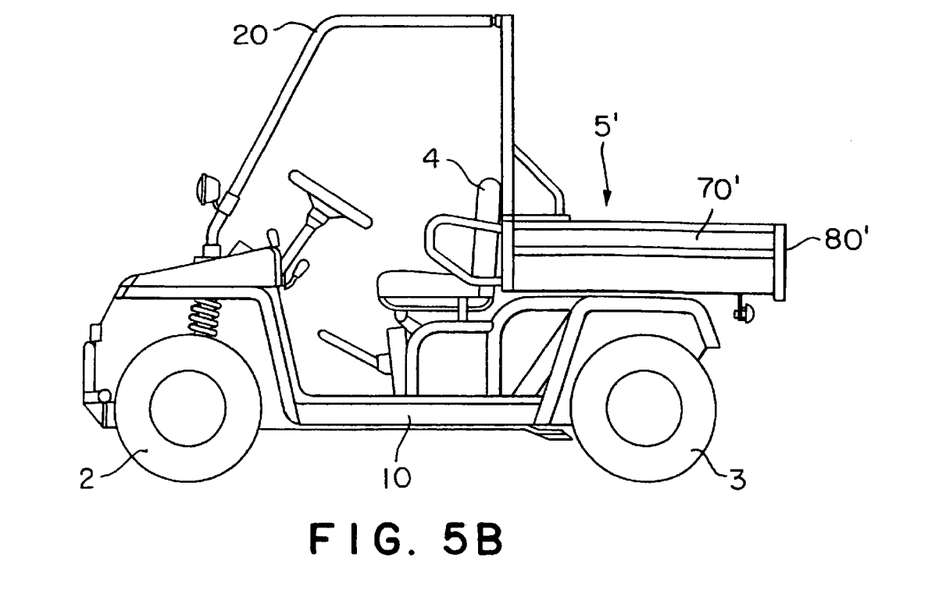

Referring to FIGS. 5A and 5B showing a general four-wheeled utility vehicle disclosed in Japanese Utility Model Laid-open publication No. Sho 63-202579, the four-wheeled utility vehicle has a body frame 10 of a metal, four wheels, i.e., two front wheels 2 and two rear wheels 3, suspended from the body frame 10, a driving unit including an engine, mounted on the body frame 10, a driver's seat 4 and a load-carrying platform 5'. The four-wheeled utility vehicle is often provided with wide tires suitable for traveling on rough roads. A cabin frame 20 is disposed in front of the load-carrying platform 5' so as to cover the front, rear, right and left sides of the driver's seat 4. The cabin frame 20 protects the driver. A roof or a hood, not shown, can be attached to the cabin frame 20. Generally, the utility vehicle is not provided with any side door beside the driver's seat 4 and is not provided with any windshield because the maximum traveling speed, i.e., the upper limit of traveling ability, of the utility vehicle is low and the driver must be able to get on and off the utility vehicle easily for efficient work.

Figure 6:
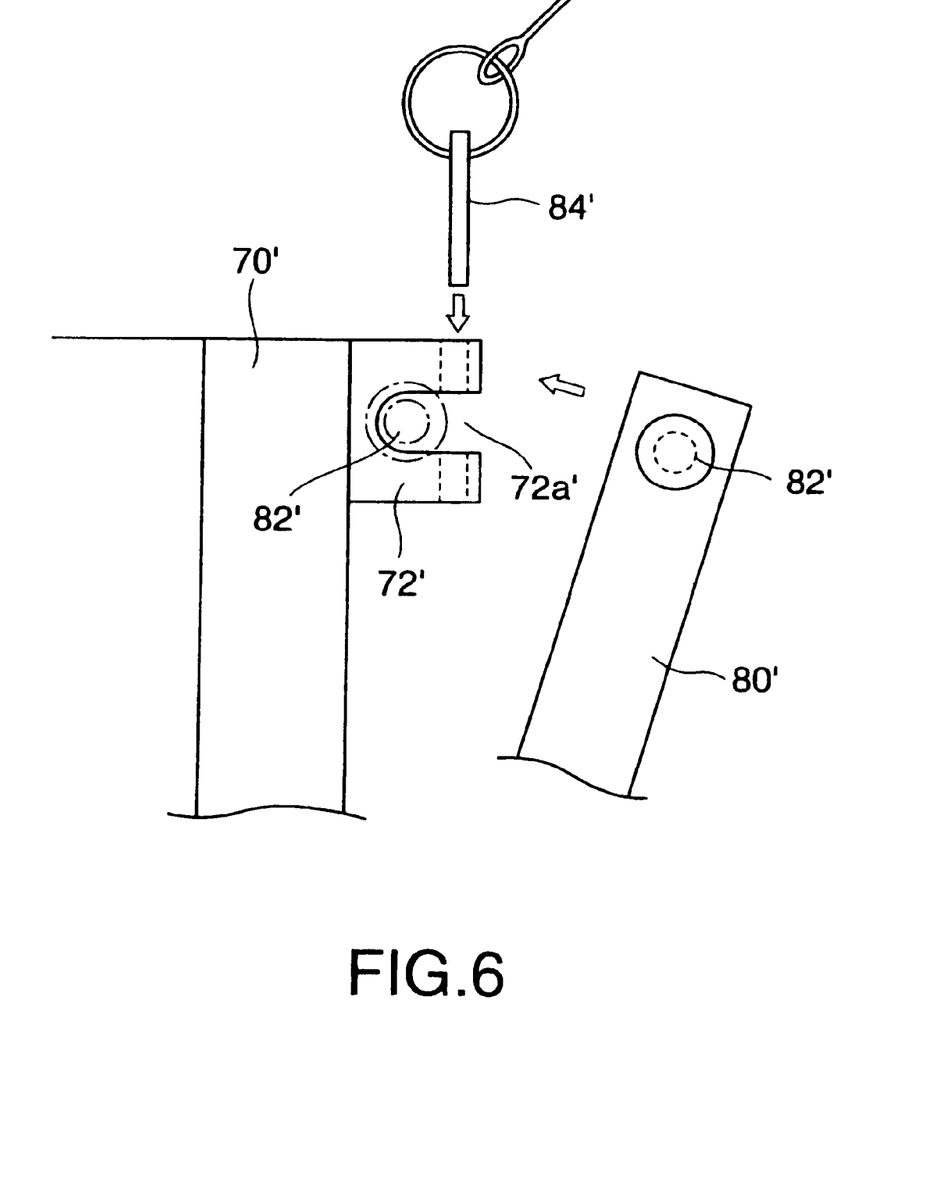
FIG. 6 is a fragmentary side elevation of a load-carrying platform, a side plate and a gate included in the utility vehicle shown in FIG. 5.

The load-carrying platform 5' has side plates 70' set on the opposite sides thereof, and a gate 80' hinged on the rear end thereof to hold cargo thereon. The gate 80' can be turned for opening and closing on a laterally extending support rod, not shown, to which a lower portion of the gate 80' is supported. The gate 80' is opened by turning the same backward on the support rod to facilitate loading cargo on the load-carrying platform 5' and is closed by turning the same forward on the support rod to hold cargo on the load-carrying platform 5'. The gate 80' is kept closed with locking pins 84' as shown in FIG. 6. When the gate 80' is closed, a locking bar 82' attached to the side of the gate 80' enters a groove 72a' formed in a bracket 72' attached to the rear end of the side plate 70'. The locking pin 84' is inserted in holes formed in the bracket 72' to retain the locking bar 82' in the groove 72a' of the bracket 72'. The gate 80' is unable to turn backward on the support rod and to open unless the locking pin 84' is pulled out of the holes of the bracket 72' to release the locking bar 82' from the bracket 72'.

The gate capable of being kept closed by the locking pin is simple in construction and inexpensive. However, the driver, i.e., the operator, needs to grip the locking pin to pull out the same from the holes of the bracket to open the gate and to insert the locking pin in the holes of the bracket to close the gate. These operations take time and are troublesome, and reduces the efficiency of cargo carrying work.

SUMMARY OF THE INVENTION

Accordingly, it is an object of the present invention to provide a utility vehicle having a load-carrying platform provided with a gate that is simple in construction and can be easily opened and closed.

According to the present invention, a utility vehicle has a load-carrying platform; a pair of side plates disposed on opposite sides of the load-carrying platform; a gate disposed on a rear end of the load-carrying platform, the gate being supported on and swingable about a laterally extending support rod for opening and closing; a pair of gate locking bolts mounted on the gate each capable of engaging the side plate to hold the gate in the closed state, wherein the gate locking bolt is axially movable in lateral directions between a locking position where a head portion thereof projects laterally outward from a side end of the gate and engages the side plate and a retracted position where the head portion thereof is separated from the side plate, wherein the gate locking bolt is biased toward the locking position by a spring, and wherein the gate locking bolt is capable of being urged toward the retracted position by the side plate that engages the head portion of the gate locking bolt just before the gate is joined to the side plates when the gate is turned to be closed; and a pair of handles each connected to the gate locking bolt, wherein the gate locking bolt is capable of being moved to the retracted position by operating the handle.

Unless otherwise specified, the words "front", "rear", "right" and "left" are used herein to signify position or direction with respect to the direction of forward travel of the utility vehicle, and the words "lateral" and "outer" are used to signify the right/left side portions of the utility vehicle. The words "lateral", "back-and-forth (longitudinal)", "vertical" and "horizontal" are not used in strict sense and is used to signify being substantially lateral, being substantially back-and-forth (longitudinal), being substantially vertical and being substantially horizontal.

The gate of the utility vehicle of the present invention can be opened and closed in the following manner.

When opening the gate, the handles are operated to move the gate locking bolts to their retracted positions, and then the gate is turned on the support rod to open the same. The gate locking bolt can be easily moved to the retracted position against the resilience of the spring. Any troublesome operations, such as pulling locking pins or turning screws are not needed.

When closing the gate, the gate is turned on the support rod to set the gate in a vertical position. When the gate is opened and the handle is released, the gate locking bolt is biased laterally outward by the spring. The head portions of the gate locking bolts project outward from the opposite ends of the gate. When the gate is turned toward the closed position, the head portion of the gate locking bolt comes into engagement with the side plate. Before the gate is completely closed, the gate locking bolt is urged toward the retracted position by the side plate, and then the gate locking bolt is moved to the locking position by the spring. The gate locking bolt engages the side plate upon the arrival of the gate at the closed position to lock the gate at the closed position. The gate locking bolt is moved toward the retracted position against the resilience of the spring just before the gate is closed completely. Therefore, although the gate must be pressed with some force, the gate can be easily closed by a single closing action.

The gate locking bolt can be easily moved toward the retracted position by the side plate when the head portion of the gate locking bolt is beveled properly, and the gate can be easily supported for turning on the support rod. Therefore, the gate of the utility vehicle is simple in construction, durable and suitable for the load-carrying platform of the utility vehicle.

Preferably, the gate has opposite end portions each restrains a portion of the side plate where the gate locking bolt is engaged nearby from laterally moving away from the gate locking bolt.

When the load-carrying platform is fully loaded with cargo, the side plates of the load-carrying platform are liable to be tilted forcibly outward. If the side plates are tilted excessively, it is possible that the side plates are disengaged from the gate locking bolts. Since the portions of the side plates in engagement with the gate locking bolts are restrained from moving away from the gate locking bolts by the opposite end portions of the gate, the side plates cannot be disengaged from the gate locking bolts. Consequently, the gate and the side plates are connected steadily, cooperate to prevent the dislocation and deformation thereof. As a result, cargo can be stably held on the load-carrying platform.

Preferably, the utility vehicle further includes a pipe attached to the gate in a horizontal position in which the gate locking bolt and the spring are inserted, the pipe being provided with a slot through which the handle is projecting outside from the pipe, wherein the slot has an axial guide section extending parallel to an axis of the pipe for enabling the handle to move laterally and a circumferential guide section continuous with the axial guide section for setting the handle when the gate is closed, the circumferential guide section being formed so as to extend vertically downward from the axial guide section when the gate is closed.

The gate locking bolt is able to move axially in the pipe and is biased toward the locking position by the spring placed in the pipe. Since the handle attached to the gate locking bolt projects outside through the slot from the pipe, the user is able to move the gate locking bolt to the retracted position by operating the handle. The gate locking bolt can be moved between the locking position and the retracted position by moving the handle along the axial guide section of the slot. The gate locking bolt can be locked at the locking position by placing the handle in the circumferential guide section with the gate locking bolt placed at the locking position. Namely, the handle is moved along the axial guide section of the slot so as to project the gate locking bolt and then the handle is turned downward in the circumferential guide section to lock the gate locking bolt at the locking position. Since the circumferential guide section of the slot is extending vertically downward when the gate is closed, the handle can be held in a vertical position by gravity and the gate locking bolt is kept stably in engagement with the side plate.

Preferably, the axial guide section of the slot has an outer end portion extending outward beyond a line aligned with an outer edge of the circumferential guide section by a distance not greater than a radius of a base portion of the handle.

When the circumferential guide section of the slot is extending vertically downward from the outer end of the axial guide section, the handle may accidentally turn downward along the circumferential guide section by gravity and is restrained from axial movement before the gate is closed completely, depending on the weight of the handle and the resilience of the spring. In this case, the gate locking bolt cannot be temporarily moved toward the retracted position just before the gate is closed completely. Then, the gate locking bolt obstructs the gate and the gate cannot be closed simply by turning the same on the support rod.

On the other hand, if the outer end portion of the axial guide section of the slot is extended beyond the line aligned with the outer edge of the circumferential guide section, the handle is unable to accidentally turn vertically downward along the circumferential guide section because the base portion of the handle is held in the outer end portion of the axial guide section by the pressure exerted on the gate locking bolt by the spring. Since the outer end portion is a part of the axial guide section, the gate locking bolt is able to move axially as long as the handle is in the outer end portion of the axial guide section and hence the gate can be easily closed simply by turning the same.

Since the outer end portion of the axial guide section of the slot is extended beyond the line aligned with the outer edge of the circumferential guide section by a short distance not greater than the radius of the base portion of the handle, the handle can be easily moved into the circumferential guide section by a simple operation after the gate has been completely closed. Since the distance of outward extension of the outer end portion beyond the line aligned with the outer edge of the circumferential guide section of the slot is not greater than the radius of the base portion of the handle engaging in the slot, the handle can be moved from the outer end portion of the axial guide section into the circumferential guide section by applying a slight force vertically downward to the handle.

Preferably, the laterally extending support rod is located at a lower side of the gate for enabling the gate to be opened by pulling an upper portion of the gate backward. When the gate is closed, a front surface of the gate is substantially included in a plane including rear ends of the side plates, side end surfaces of the gate are substantially included in planes including inner surfaces of the side plates, respectively. The rear end of the side plate and a side end of the gate are connected by a flexible elongated member.

The gate will swing like a pendulum if the upper side of the gate is supported on the support rod. Such a gate is suitable for unloading bulk cargo, such as sand or powder. The gate having the lower side supported on the support rod and capable of being turned on its lower side is suitable for loading and loading ordinary cargo. In the latter case, it is preferable to support the gate in an open position by a flexible elongated member having one end connected to the rear end of the side plate and the other end connected to the upper portion of the gate to prevent the gate from turning excessively and to prevent the excessive loading of the support rod. When the flexible elongated member is used for such purposes, it is desirable to arrange the member so that the member does not jut from the side and rear outlines of the utility vehicle.

Moreover, the flexible elongated member, such as a wire rope or a chain, for supporting the gate that turns on the support rod supporting the lower side of the gate in the open position can be properly arranged so that the flexible elongated member may not jut from the side and rear outlines of the utility vehicle. This is because the space having the shape of a rectangular cylinder defined by the rear end surface of the side plate, the side end surface of the gate, a plane including the outer surface of the side plate and a plane including the rear surface of the gate are formed when the side plate and the gate are arranged with the front surface and the end surface of the closed gate positioned in the foregoing positional relation relative to the side plate, and the flexible elongated member can be received in the space having the shape of a rectangular cylinder.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
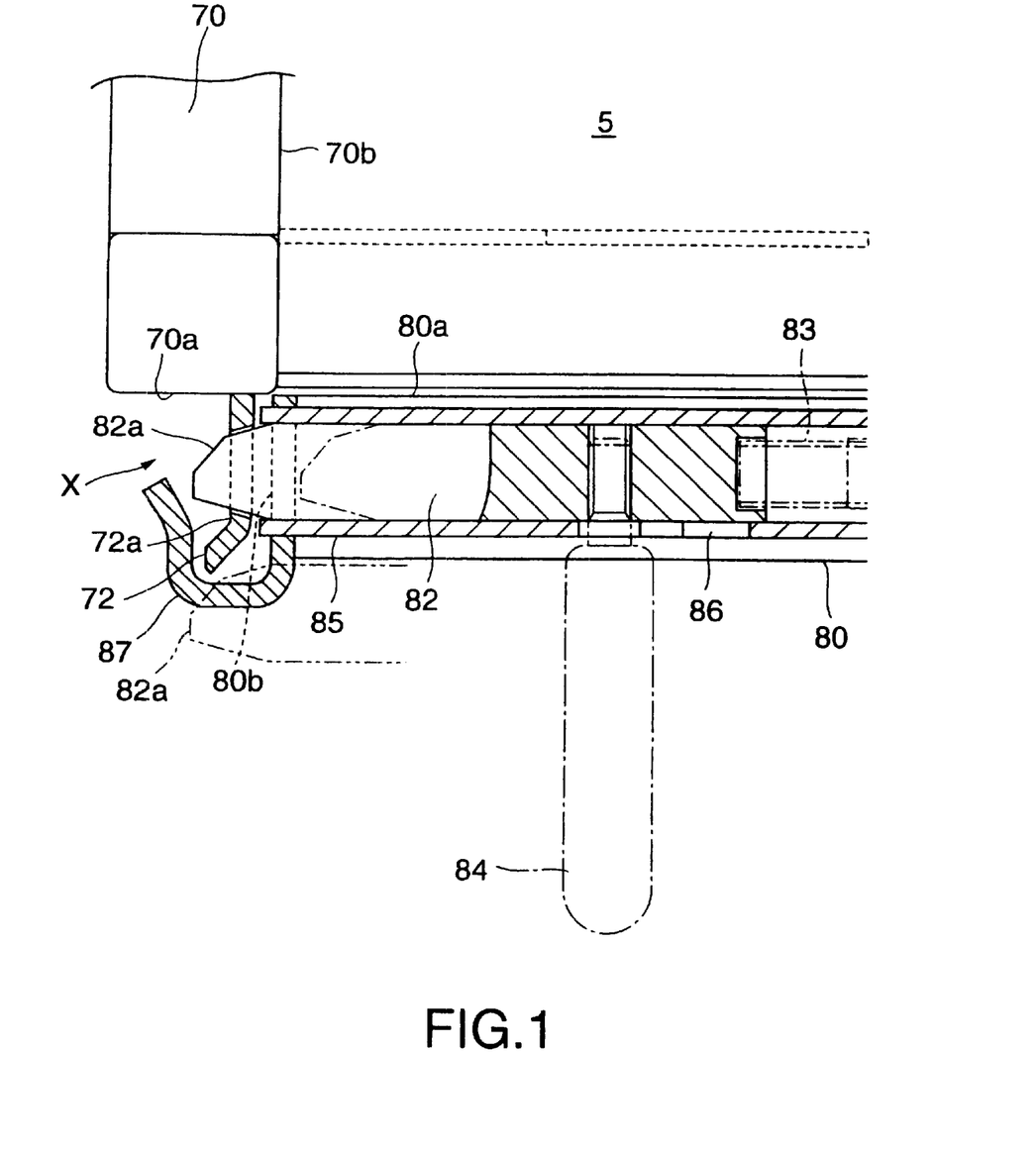
FIG. 1 is a fragmentary top view of a load-carrying platform, a side plate and a gate included in a utility vehicle in a preferred embodiment according to the present invention (taken along I—I line in FIG. 2A)
Figure 2A:
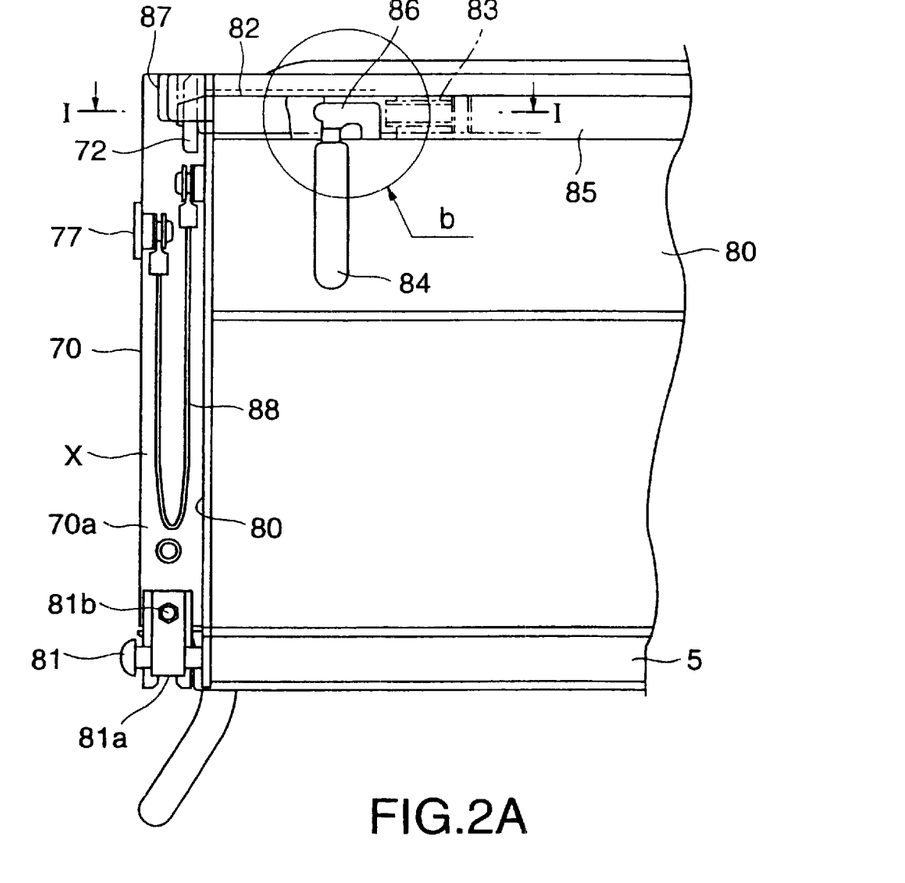
FIG. 2A is a fragmentary rear view of the load-carrying platform, the side plate and the gate shown in FIG. 1.
Figure 2B:
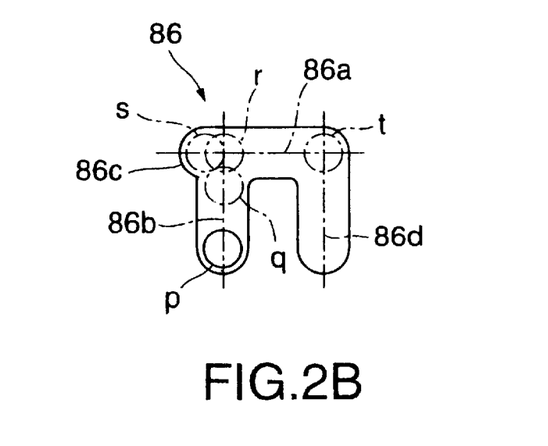
FIG. 2B is a development of a slot formed in a pipe shown in FIG. 2A.
Figure 3:
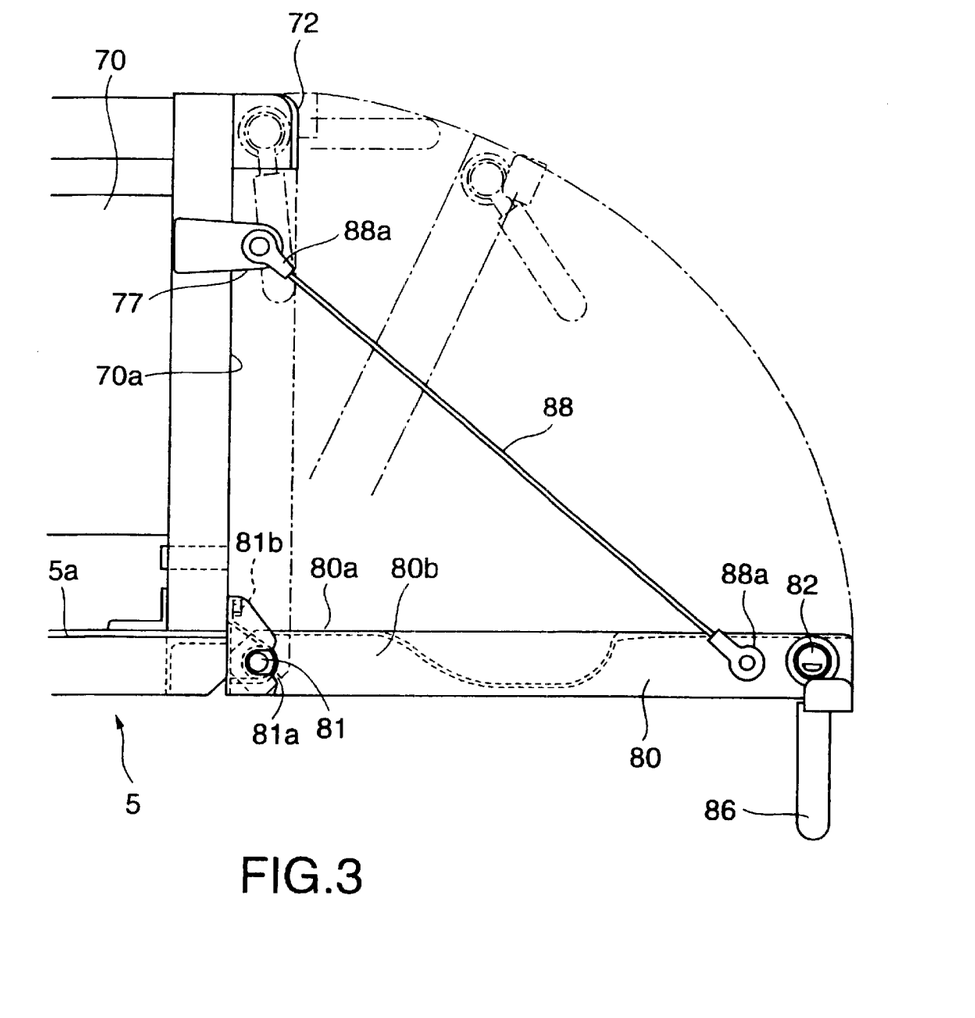
FIG. 3 is a fragmentary side elevation of the load-carrying platform, the side plate and the gate of the utility vehicle shown in FIG. 1 in a state where the gate is opened.
Figure 4:
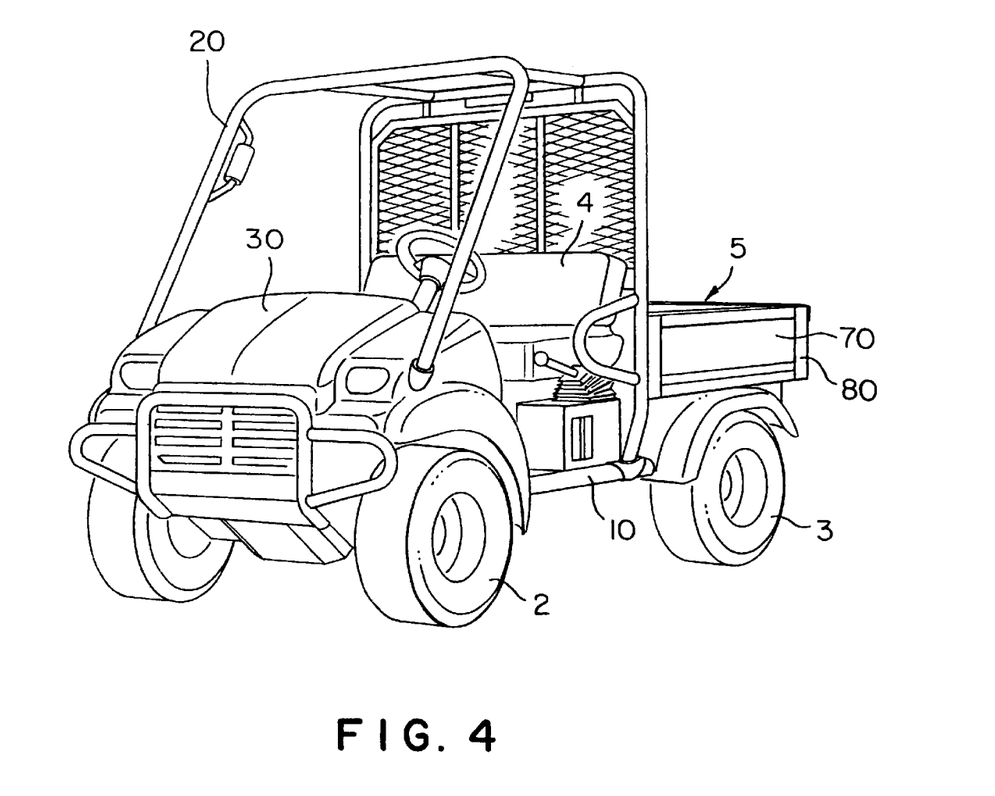
FIG. 4 is a perspective view of the four-wheeled utility vehicle embodying the present invention.

A four-wheeled utility vehicle in a preferred embodiment according to the present invention will be described with reference to FIGS. 1 to 4. FIG. 4 is a perspective view of the four-wheeled utility vehicle. FIG. 3 is a fragmentary side elevation showing a rear portion of a load-carrying platform 5 and vicinity thereof in a state where a gate 80 is opened. FIG. 2A is a rear view of a left portion of the load-carrying platform 5 and vicinity thereof. FIG. 2B is a development of a slot 86 formed in a pipe 85 shown in FIG. 2A. FIG. 1 is a sectional view taken on line I—I in FIG. 2A. The load-carrying platform 5 is provided with right and left side plates set on the right and left sides thereof, and the gate 80 having a lower side hinged on the rear end thereof. The right and left side plates 70 are symmetrical, and the gate 80 is symmetrical with respect to a vertical plane including the back-and-forth (longitudinal) axis of the utility vehicle.

Referring to FIG. 4, the utility vehicle has a steel body frame 10, four wheels, i.e., front wheels 2 and rear wheels 3, suspended from the body frame 10, a driver's seat 4 mounted on the body frame 10 and the load-carrying platform 5 mounted on the body frame 10. A driving unit including an engine, not shown, is disposed under the load-carrying platform 5. The driving unit drives the rear wheels 3 or both the rear wheels 3 and the front wheels 2 for traveling. The wheels 2 and 3 are provided with wide tires suitable to enable the four-wheeled utility vehicle to travel on rough roads. Any windshield is not installed in front of the driver's seat 4.

A baggage case, not shown, and an openable hood 30 are disposed above the front wheels 2. The driver's seat 4 is disposed behind the hood 30, and the load-carrying platform 5 is disposed behind the driver's seat 4. The load-carrying platform 5 extends backward from a position near the back of the driver's seat 4 over the rear wheels 3. A cabin frame 20 is disposed between a front portion of the body frame 10 and a position in front of the load-carrying platform 5 so as to cover the driver's seat 4.

The load-carrying platform 5 has the side plates 70 set upright on the opposite sides thereof, and the gate 80 supported on the rear end thereof. The gate 80 is set in an upright position as shown in FIG. 4 to close the rear end of the load-carrying platform 5 to hold cargo on the load-carrying platform 5 in cooperation with the side plates 70.

Referring to FIG. 3, support rods 81 each having a head are attached to right and left end portions of the lower side of the gate 80 such that outer portions of the support rods 81 with the heads project laterally outward from the opposite side ends of the gate 80 as shown in FIG. 2A. The outer portions of the support rod 81 are supported on the rear ends of the side plates 70 by steel bands 81a fastened to the rear ends of the side plates 70 so that the gate 80 can be turned backward for opening and forward for closing on the support rod 81. As shown in FIG. 3, wire ropes 88 are extended between upper portions of the side ends of the gate 80 and upper portions of the rear ends of the side plates 70, respectively, to limit the backward turning of the gate 80. The wire ropes 88 can be replaced with any other flexible elongated members, such as chains. The gate 80 can be turned backward from its closed position through an angle of about 90° for opening. Connectors 88a are connected to the opposite ends of each wire rope 88. The connectors 88a are connected to the opposite side ends of the gate 80 and the other connectors 88a are connected to brackets 77 attached to the side plates 70, respectively.

As shown in FIG. 2A, the wire ropes 88 extended between the side ends of the gate 80 and the side plates 70 are received in spaces X having the shape of a rectangular cylinder formed in the rear corners of the load-carrying platform 5, so that the wire ropes 88 do not jut from the side and rear outlines of the utility vehicle.

Referring to FIG. 1, when the gate 80 is closed, the front surface 80a of the gate 80 and the rear end surfaces 70a, excluding the band 81a, the bracket 77 and a locking member 72, of the side plates 70 are included in a vertical plane, and the side end surfaces 80b, excluding head portions 82a of gate locking bolts 82 and retaining members 87, of the gate 80 are included in vertical planes including the inner surfaces 70b of the side plates 70, respectively. Thus, each space X having the shape of a rectangular cylinder is defined by a plane including the outer surface of the side plate 70, a plane including the rear surface of the gate 80, the rear end surface 70a of the side plate 70 and the side end surface 80b of the gate 80. The spaces X are formed in the rear corners of the load-carrying platform 5, respectively, as shown in FIGS. 1 and 2. The wire ropes 88 can be stored in the spaces X.

Gate locking bolts 82 are axially slidably supported on upper portions of the gate 80 so as to be able to engage in openings 72a formed in locking plates 72 attached to upper portions of the right and the left side plate 70, respectively, as shown in FIGS. 1 and 2A. The head portion 82a of each gate locking bolt 82 engages in the opening 72a of the locking plate 72 to hold the gate 80 at the closed position. A compression coil spring 83 is inserted in a pipe 85, such as a steel pipe, fixed to an upper portion of the gate 80 in a horizontal position. Each gate locking bolt 82 is axially slidably inserted in the pipe 85 with a base end thereof pressed against the compression coil spring 83. The gate locking bolt 82 is biased outward by the compression coil spring 83. The head portion 82a of each gate locking bolt 82 is properly beveled and a rear portion of the locking plate 72 is bent outward to form a guide surface. When the gate 80 is turned from its open position toward the closed position, the bevel of beveled head portion 82a of the gate locking bolt 82 slides along the guide surface of the locking plate 72, so that the gate locking bolt 82 is forced into the pipe 85.

A handle 84 for operating the gate locking bolt 82 is attached to the gate locking bolt 82 so as to extend perpendicularly to the gate locking bolt 82 and to engage in a slot 86 formed in the wall of the pipe 85. The gate locking bolt 82 can be disengaged from the locking plate 72 by gripping the handle 84 by hand and moving the same away from the locking plate 72, i.e., rightward as viewed in FIG. 1, against the resilience of the compression coil spring 83. A base portion of the handle 84 is engaged in the slot 86 of the pipe 85. The handle 84 can move in the directions and ranges that are defined by the shape and dimensions of the slot 86. As shown in FIG. 2B, the slot 86 has an axial guide section 86a, an outer circumferential guide section 86b extending from an outer end portion of the axial guide section 86a, and an inner circumferential guide section 86d extending from an inner end portion of the axial guide section 86a. The gate locking bolt 82 can be axially moved when the base portion of the handle 84 is in the axial guide section 86a, and cannot be axially moved when the base portion of the handle 84 is in either the outer circumferential guide section 86b or the inner circumferential guide section 86d.

The spring 83, the handle 84 and the pipe 85 provided with the slot 86 are thus arranged. Therefore, the gate locking bolt 82 can be axially moved between the locking position, i.e., a position indicated by continuous lines in FIG. 1, where the head portion 82a is projected from the pipe 85, and the retracted position, i.e., a position indicated by chain lines in FIG. 1, where the head portion 82a is disengaged from the locking plate 72 by axially moving the handle 84 along the axial section 86a. The gate locking bolt 82 can be held at the locking position by the compression coil spring 83. The gate locking bolt 82 can be moved toward the retracted position as the bevel of the beveled head portion 82a of the gate locking bolt 82 slides along the guide surface of the locking plate 72 just before the gate 80 is closed completely. The gate locking bolt 82 can be moved to the retracted position by operating the handle 84. The gate locking bolt 82 can be kept immovable at the locking position by setting the handle 84 in the outer circumferential guide section 86b. And the gate locking bolt 82 can be kept immovable at the retracted position by setting the handle 84 in the inner circumferential guide section 86d.

As shown in FIG. 2B, the slot 86 has an outer end portion 86c extended outward beyond a line aligned with the outer edge of the outer circumferential guide section 86b by a slight distance in the range of 2 to 3 mm not greater than the radius of the base portion of the handle 84 engaging in the slot 86. Therefore, when the handle 84 is in the outer end portion 86c, the handle 84 must be retracted by a distance in the range of 2 to 3 mm to move the handle 84 into the outer circumferential guide section 86b.

The gate 80 thus constructed can be very simply opened and closed. When opening the gate 80 closed as shown in FIG. 2A, each of the handles 84 is moved from a position p (shown in FIG. 2B) in the outer circumferential guide section 86b via a position r in the axial guide section 86a to a position t in the axial guide section 86a, and then the gate 80 is turned slightly backward. Consequently, the gate locking bolt 82 is disengaged from the locking plate 72 to unlock the gate 80. Then, the handles 84 are released and the gate 80 is turned backward on the lower support rod 81, so that the gate 80 can be fully opened. When the handles 84 are released, the gate locking bolt 82 is moved outward, i.e., to the left as viewed in FIG. 2A, by the compression coil spring 83 and each handle 84 is moved to a position near the position r. Even if the handle 84 is moved to a position near a position q in the outer circumferential guide section 86b (FIG. 2B), the handle 84 can be moved to the position r in the axial guide section 86a by the agency of centrifugal force and weak shocks when the gate 80 is turned open. As a result, the handle 84 is moved to and stably held at a position s in the outer end portion 86c. Therefore, the gate 80 can be closed simply by turning the gate 80 forward by hand. When the gate 80 is turned forward to close the same, the beveled head portion 82a of the gate locking bolt 82 engages the locking plate 72 as indicated by two-dot chain lines in FIG. 1 and slides along the guide surface of the locking plate 72, so that the gate locking bolt 82 is moved temporarily inward against the resilience of the compression coil spring 83, i.e., the handle 84 is moved toward the position t (FIG. 2B). And then the gate locking bolt 82 is moved outward by the resilience of the compression coil spring 83 and the head portion 82a of the gate locking bolt 82 engages in the opening 72a of the locking plate 72. As a result, the handle 84 is held at the position s in the outer end portion 86c. After the gate 80 has been thus completely closed, the handle 84 is moved into and turned along the outer circumferential guide section 86b to the position p to lock the gate 80 in place. Thus, the gate 80 can be easily opened and closed and hence the utility vehicle is able to carry out its original work efficiently. The head portion 82a of the gate locking bolt 82 is beveled so that the bevel of the head portion 82a is substantially parallel to the guide surface of the locking plate 72 as indicated by two-dot chain lines in FIG. 1 when the handle 84 is in the axial guide section 86a of the slot 86. On the other hand, the bevel of the head portion 82a is not parallel to the guide surface of the locking plate 72 when the handle 84 is in the outer circumferential guide section 86b or the inner circumferential guide section 86d.

Although it is preferable to form the outer end portion 86c of the slot 86 so as to extend outward beyond the line aligned with the outer edge of the outer circumferential guide section 86b from the axial guide section 86a of the slot 86, the outer end portion 86c may be omitted as long as the gate locking bolt 82 can be temporarily held so as to be axially movable with the head portion 82a projected from the pipe 85. Although the gate 80 can be turned without locking the handle 84 with the gate locking bolt 82 at the retracted position, the handle 84 may be moved into the inner circumferential guide section 86d with the gate locking bolt 82 at the retracted position when turning the gate 80.

The retaining member 87 having a J-shaped cross section is attached to an upper end portion of the gate 80 contiguously with the outer end of each pipe 85. An outer portion of the retaining member 87 extends on the outer side of the locking plate 72 attached to the side plate 70 when the gate 80 is closed to prevent the outward displacement of the rear end of the side plate 70. So long as the rear end of the side plate 70 is restrained from outward displacement, the head portion 82a of the gate locking bolt 82 is not disengaged from the locking plate 72 and the stable connection of the gate 80 and the side plates 70 can be maintained.

The gate 80 of the working vehicle can be used in the following manner. The front end of the load-carrying platform 5 can be raised to tilt the load-carrying platform 5 to facilitate the inspection and maintenance of the engine and the like disposed under the load-carrying platform 5. The lower support rod 81 shown in FIGS. 2 and 3 can be disconnected from the side plates 70 while the gate locking bolts 82 are engaged with the locking plates 72. The support rod 81 can be disconnected from the side plates 70 to release the support rod 81 by unfastening bolts 81b fastening the steel bands 81a to the side plates 70. When the gate 80 is thus supported only by the gate locking bolts 82 on the side plates 70, the gate 80 turns on the gate locking bolts 82 to open the rear end of the load-carrying platform 5 when the front end of the load-carrying platform 5 is raised to tilt the load-carrying platform 5, which facilitates unloading bulk cargo, such as sand. If the lower side of the gate 80 needs to be opened frequently, gate locking bolts, handles, a pipe and locking plates similar to the gate locking bolts 82, the handles 84, the pipe 85 and the locking plates 72 may be arranged instead of the support rod 81 on lower portion of the gate 80. The gate locking bolts 82, the handles 84, the pipe 85 and the locking plates 72 may be arranged only on lower portion of the gate 80 and the side plates 70. When the gate locking bolts 82 that can be easily engaged with and disengaged from the locking plates 72 attached to the side plates 70 are disposed on the lower portions of the gate 80, the lower portions of the gate 80 can be easily released from the side plates 70 to turn the gate 80 on its upper side.

A modification of the aforementioned embodiment will be explained hereunder with reference to FIG. 7.

Figure 7:
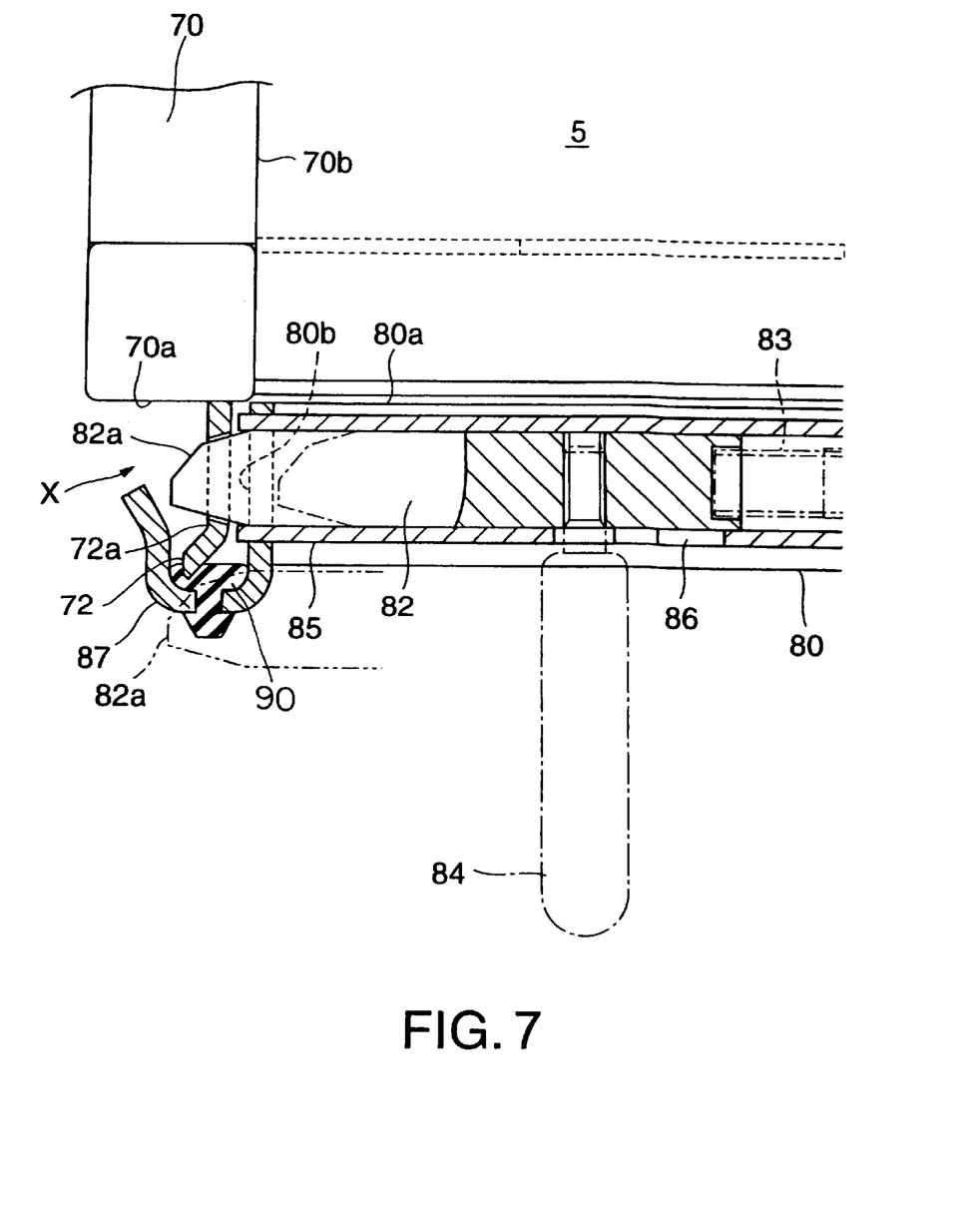
FIG. 7 is a fragementary top view of the load-carrying platform, the side plate and the gate included in a modification of the embodiment shown in FIG. 1.

As shown in FIG. 7, an elastic member (pressing means) made of rubber is mounted on the inner surface of each retaining member 87.

The opening 72a of the locking plate 72 is configured so that a clearance exists between the outer surface of the head portion 82a of the gate locking bolt 82 and the periphery of the opening 72a.

When the gate is closed, the elastic member 90 is pressed by the read end of the locking plate 72 and the inner surface of the retaining member 87. The pressed elastic member 90 produces a force to press the retaining member 87 rearward. Accordingly, the rear surface of the head portion 82a of the gate locking bolt 82 is pressed against the rear periphery of the opening 72a of the locking plate 72 when the gate 80 is closed.

In this modification, the retaining member 87 having a J-shaped cross section can be replaced with any member having a surface facing the rear end of the locking plate 72 when the gate 80 is closed.

According to this modification, the gate locking bolt 82 can be engaged smoothly in the opening 72a of the locking plate 72 since the opening 72a is configured so that a clearance exists between the outer surface of the head portion 82a and the periphery of the opening 72a.

Moreover, according to this modification, the closed gate is prevented from vibrating when the utility vehicle is traveling since the head portion 82a of the gate locking bolt 82 is pressed against the periphery of the opening 72a of the locking plate 72.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A utility vehicle comprising:
    a load-carrying platform;
    a pair of side plates, each side plate disposed on opposite sides of the load-carrying platform;
    a gate disposed on a rear end of the load-carrying platform, the gate being supported on and swingable about a laterally extending support rod for opening and closing;
    a pair of gate locking bolts mounted on the gate, each gate locking bolt engaging corresponding side plate to hold the gate when closed, the gate locking bolt being axially movable in lateral directions between a locking position where a head portion thereof projects laterally outward from a corresponding side end of the gate and engages the corresponding side plate and a retracted position where the head portion thereof is separated from the corresponding side plate, the gate locking bolt being biased toward the locking position by a spring, and the gate locking bolt being configured to be urged toward the retracted position by the corresponding side plate that engages the head portion of the gate locking bolt just before the gate is joined to the pair of side plates as the gate is swung closed;
    a pair of handles, each handle connected to a corresponding gate locking bolt, the corresponding gate locking bolt being configured to be moved to the retracted position by operating the handle; and
    a pipe attached to the gate in a horizontal position, the gate locking bolt and the spring being inserted in the pipe, the pipe having a slot through which the handle projects outside from the pipe, the slot having an axial guide section extending parallel to an axis of the pipe for enabling the handle to move laterally and a transverse guide section transverse to and continuous with the axial guide section, the transverse guide section extending vertically downward from the axial guide section when the gate is closed, the handle being configured to be held by the transverse section so that the gate locking bolt is fixed at the locking position, the axial guide section having an outer end portion extending laterally outward beyond a line aligned with an outer edge of the transverse guide section.

2. The utility vehicle according to claim 1, wherein the gate has opposite end portions, each end portion restraining a corresponding side plate where the corresponding gate locking bolt is engaged in the locking position.

3. The utility vehicle according to claim 1, wherein the handle has a circular cross section at a base portion which is inserted into the slot; and wherein the outer end portion extends outward beyond the line aligned with the outer edge of the transverse guide section by a distance not greater than a radius of the base portion of the handle.

4. The utility vehicle according to claim 1, wherein the laterally extending support rod is located at a lower side of the gate for enabling the gate to be opened by pulling an upper portion of the gate backward,
    wherein, when the gate is closed, a front surface of the gate is substantially included in a plane including rear end surfaces of the side plates, and side end surfaces of the gate are substantially included in planes including inner surfaces of the side plates, respectively, and
    wherein a rear end surface of the side plate and a corresponding side end surface of the gate is connected by a flexible elongated member which is received in a space defined by the rear end surface of the side plate and the side end surface of the gate.

5. The utility vehicle according to claim 1, wherein a locking plate is attached to a rear end of each side of the pair of side plates, the locking plate having an opening in which a head portion of the gate locking bolt engages, the locking plate being bent laterally outward to form a guide surface for guiding the gate locking bolt when the gate is swung closed.

6. The utility vehicle according to claim 5, wherein the head portion of the gate locking bolt includes a beveled surface which faces the guide surface of the locking plate just before the gate is completely closed, the beveled surface of the gate locking bolt having a substantially same angle of inclination as an angle of inclination of the guide surface.

7. The utility vehicle according to claim 5, wherein the gate has opposite end portions each restraining the locking plate of the side plate from laterally moving away from the gate locking bolt.

8. A utility vehicle comprising:
    a load-carrying platform;
    a pair of side plates, each side plate disposed on opposite sides of the load-carrying carrying platform;
    a gate disposed on a rear end of the load-carrying platform, the gate being supported on and swingable about a laterally extending support rod for opening and closing;

a pair of gate locking bolts mounted on the gate, each gate locking bolt engaging a corresponding side plate to hold the gate when closed, the gate locking bolt being axially movable in lateral directions between a locking position where a head portion thereof projects laterally outward from a corresponding side end of the gate and engages the corresponding side plate and a retracted position where the head portion thereof is separated from the corresponding side plate, the gate locking bolt being biased toward the locking position by a spring, and the gate locking bolt being configured to be urged toward the retracted position by the corresponding side plate that engages the head portion of the gate locking bolt just before the gate is joined to the pair of side plates as the gate is swung closed;

a pair of handles, each handle connected to a corresponding gate locking bolt, the corresponding gate locking bolt being configured to be moved to the retracted position by operating the handle;

a pair of locking plates, each locking plate being attached to a rear end of each side plate of the pair of side plates; the locking plate having an opening in which a head portion of the gate locking bolt engages, the opening of the locking plate being configured so that a clearance exists between an outer surface of the head portion of the gate locking bolt and a periphery of the opening of the locking plate when the gate is closed; and pressing means for pressing the head portion of the gate locking bolt against the periphery of the opening of the locking plate when the gate is closed, wherein the gate has a retaining member at opposite end portions of the gate, each retaining member restraining the locking plate of the side plate from laterally moving away from the gate locking bolt; and wherein the pressing means has a pair of elastic members, each elastic member being pressed by the locking plate and the retaining member when the gate is closed so that the elastic member produces a force to press the head portion of the gate locking bolt against the periphery of the opening of the locking plate.

9. The utility vehicle according to claim 8, wherein the retaining member is pressed rearward by the force produced by the elastic member.

10. The utility vehicle according to claim 9, wherein the elastic member is made of rubber.

11. A utility vehicle comprising:

a load-carrying platform;

a pair of side plates, each side plate disposed on opposite sides of the load-carrying platform;

a gate disposed on a rear end of the load-carrying platform, the gate being supported on and swingable about a laterally extending support rod for opening and closing;

a pair of gate locking bolts mounted on the gate, each gate locking bolt engaging a corresponding side plate to hold the gate when closed, the gate locking bolt being axially movable in lateral directions between a locking position where a head portion thereof projects laterally outward from a corresponding side end of the gate and engages the corresponding side plate and a retracted position where the head portion thereof is separated from the corresponding side plate, the gate locking bolt being biased toward the locking position by a spring, and the gate locking bolt being configured to be urged toward the retracted position by the corresponding side plate that engages the head portion of the gate locking bolt just before the gate is joined to the pair of side plates as the gate is swung closed;

a pair of handles, each handle connected to a corresponding gate locking bolt, the corresponding gate locking bolt being configured to be moved to the retracted position by operating the handle;

a pair of locking plates, each locking plate being attached to a rear end of each side plate of the pair of side plates; the locking plate having an opening in which a head portion of the gate locking bolt engages, the opening of the locking plate being configured so that a clearance exists between an outer surface of the head portion of the gate locking bolt and a periphery of the opening of the locking plate when the gate is closed;

pressing means for pressing the head portion of the gate locking bolt against the periphery of the opening of the locking plate when the gate is closed; and a pipe attached to the gate in a horizontal position, the gate locking bolt and the spring being inserted in the pipe, the pipe having a slot through which the handle projects outside from the pipe, the slot having an axial guide section extending parallel to an axis of the pipe for enabling the handle to move laterally and a transverse guide section transverse to and continuous with the axial guide section, the transverse guide section extending vertically downward from the axial guide section when the gate is closed, the handle being configured to be held by the transverse section so that the gate locking bolt is fixed at the locking position, the axial guide section having an outer end portion extending laterally outward beyond a line aligned with an outer edge of the transverse guide section.

12. The utility vehicle according to claim 11, wherein the handle has a circular cross section at a base portion which is inserted into the slot; and wherein the outer end portion extends outward beyond the line aligned with the outer edge of the transverse guide section by a distance not greater than a radius of the base potion of the handle.

13. The utility vehicle according to claim 8, wherein the laterally extending support rod is located at a lower side of the gate for enabling the gate to be opened by pulling an upper portion of the gate backward, wherein, when the gate is closed, a front surface of the gate is substantially included in a plane including rear end surfaces of the side plates, and side end surfaces of the gate are substantially included in planes including inner surfaces of the side plates, respectively, and wherein a rear end surface of the side plate and a corresponding side end surface of the gate is connected by a flexible elongated member which is received in a space defined by the rear end surface of this side plate and the side end surface of the gate.

14. The utility vehicle according to claim 8, wherein the locking plate being bent laterally outward to form a guide surface for guiding the gate locking bolt when the gate is swung closed.

15. The utility vehicle according to claim 14, wherein the head portion of the gate locking bolt includes a beveled surface which faces the guide surface of the locking plate just before the gate is completely closed, the beveled surface of the gate locking bolt having a substantially same angle of inclination as an angle of inclination of the guide surface.

* * * * *